Aug. 9, 1927.
M. B. HARRIS
1,638,334
VEHICLE SIDE CURTAIN
Filed Jan. 14, 1924
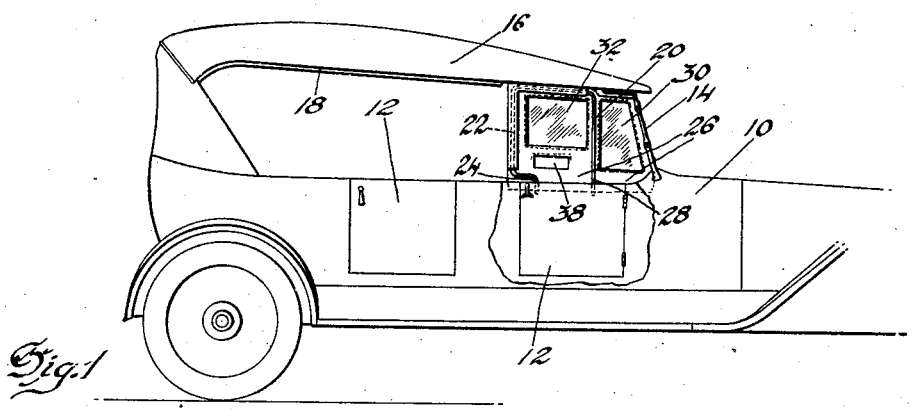
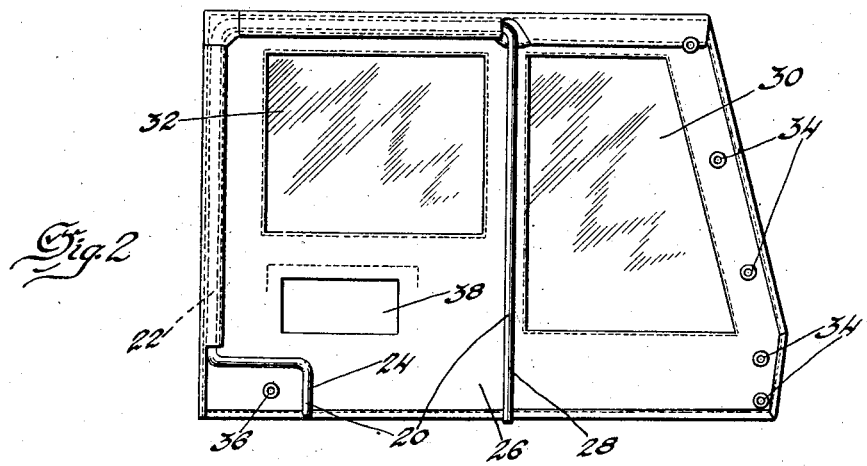
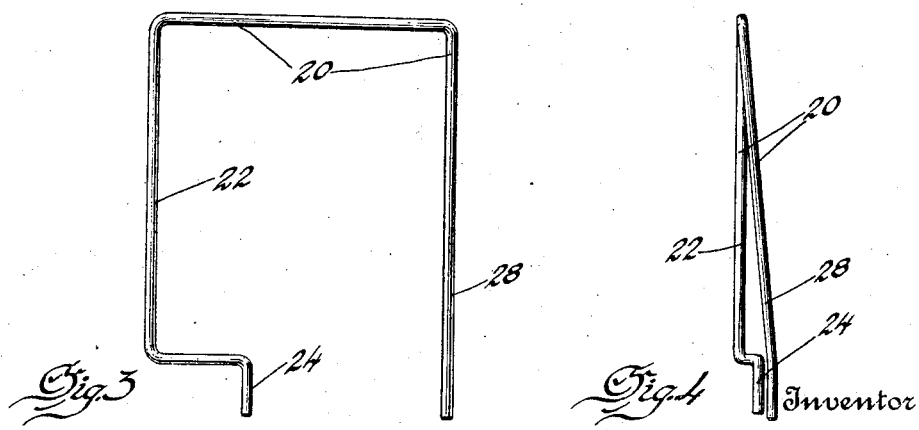
Inventor
Mark B. Harris
By his Attorneys
Blackmore, Spencer & Hurd Patented Aug. 9, 1927.

1,638,334

UNITED STATES PATENT OFFICE.

MARK B. HARRIS, OF DETROIT, MICHIGAN, ASSIGNOR TO GENERAL MOTORS CORPORATION, OF DETROIT, MICHIGAN, A CORPORATION OF DELAWARE.

VEHICLE SIDE CURTAIN.

Application filed January 14, 1924. Serial No. 686,083.

This invention relates to vehicles, and is illustrated as embodied in an automobile having side curtains opening with the doors.

An object of the invention is to provide curtains of this character which are supported rigidly in place and which can be folded without damage when not in use.

Having this object in view, the invention contemplates supporting each curtain by a U-shaped curtain rod having one leg along the free edge of the curtain and the other leg across the central portion of the curtain, the two legs being supported by sockets in the door. By this arrangement the free edge of the curtain is rigidly supported, and preferably the hinge edge is provided with fastenings to secure it firmly to the edge of the windshield or to an adjacent curtain, according to the position and construction of the door. If desired, each half of the curtain may be provided with a light opening, covered by celluloid or other transparent material, this arrangement permitting folding of the curtain without interference. I prefer to provide also an opening through which the driver may extend his arm to give signals.

The above and other objects and features of the invention, including various desirable particular constructions, will be apparent from the following description of the illustrative embodiment shown in the accompanying drawings, in which—

Fig. 1 is a side elevation, partly broken away, of an Oakland automobile equipped with the above-described curtains;

Fig. 2 is an inside elevation of one of the curtains and its curtain rod;

Fig. 3 is a side elevation of the curtain rod; and

Fig. 4 is a front elevation of the curtain rod.

In the drawings, the invention is shown as embodied in an automobile having a body 10 including doors 12, a windshield 14, and a top 16, shown as a permanent top having a rigid metal valance or curtain ledge 18 against which the curtains close. Each door 12 is provided with a pair of sockets, in or adjacent the top edge, receiving the parallel ends of the legs of a U-shaped curtain rod 20. One leg 22 of this curtain rod is offset from the portion 24 which seats in the socket, to extend along the free edge of a curtain 26, far enough beyond the edge of the door to overlap the adjacent curtain. The other leg 28 extends across the middle of the curtain, so that the curtain may be folded when not in use, without removing the curtain rod from the curtain.

Each curtain may be provided with openings covered by sheets 30 and 32 of celluloid, or other transparent material, these openings begin on opposite side of leg 28 of the curtain rod so that the transparent sheets do not interfere with folding. The curtain is provided with fastenings, shown as separable snap fastenings 34, along its hinge edge, to secure it to an adjacent curtain, or to the windshield as shown. It may also be provided with one or more fastenings 36 along its bottom edge, to fasten it more tightly to the top of the door. On at least the left front curtain I also prefer to provide an opening for the driver's arm when making signals, such opening being covered normally by a flap 38.

While one illustrative embodiment of the invention has been described in detail, it is not my intention to limit its scope to that embodiment, or otherwise than by the terms of the appended claims.

I claim:

1. In combination with a vehicle body having a door, a curtain therefor having two lights, a U-shaped frame surrounding one of said lights, the legs of the frame supported by the door, one near the edge of the door removed from the hinge and the other at an intermediate position, the second light extending beyond the door hinge line whereby the curtain may be folded into small dimensions for storage without removing the U-shaped frame.

2. In combination with a vehicle body having a door hinged at its front edge, a curtain having two lights for mounting on said door, the curtain extending beyond the door hinge line and the hinge line intersecting the forward of the two lights, a U-shaped frame supported on the door and surrounding the rear light, the rear leg of the U-shaped frame positioned at the rear edge of the door and the forward leg positioned at a point intermediate the length of the door.

In testimony whereof I affix my signature.

MARK B. HARRIS.